(No Model.)

C. F. CROCKETT.
CHAMBER PAIL.

No. 318,873. Patented May 26, 1885.

WITNESSES:

INVENTOR
Charles F. Crockett
BY
Van Santvoord & Hauff
ATTORNEYS

UNITED STATES PATENT OFFICE.

CHARLES F. CROCKETT, OF MOUNT VERNON, NEW YORK.

CHAMBER-PAIL.

SPECIFICATION forming part of Letters Patent No. 318,873, dated May 26, 1885.

Application filed April 9, 1885. (No model.)

*To all whom it may concern:*

Be it known that I, CHARLES F. CROCKETT, a citizen of the United States, residing at Mount Vernon, in the county of Westchester and State of New York, have invented new and useful Improvements in Chamber-Pails, of which the following is a specification.

My invention relates to improvements in chamber-pails of that class which are also adapted to be used as commodes; and it consists in a chamber-pail having its upper part turned inward to form a seat. A cover constructed to fit the pail and a gasket secured to the cover are used to close the pail air-tight, all of which is more fully pointed out in the following specification and claims, and illustrated in the accompanying drawings, in which—

Figure 1:
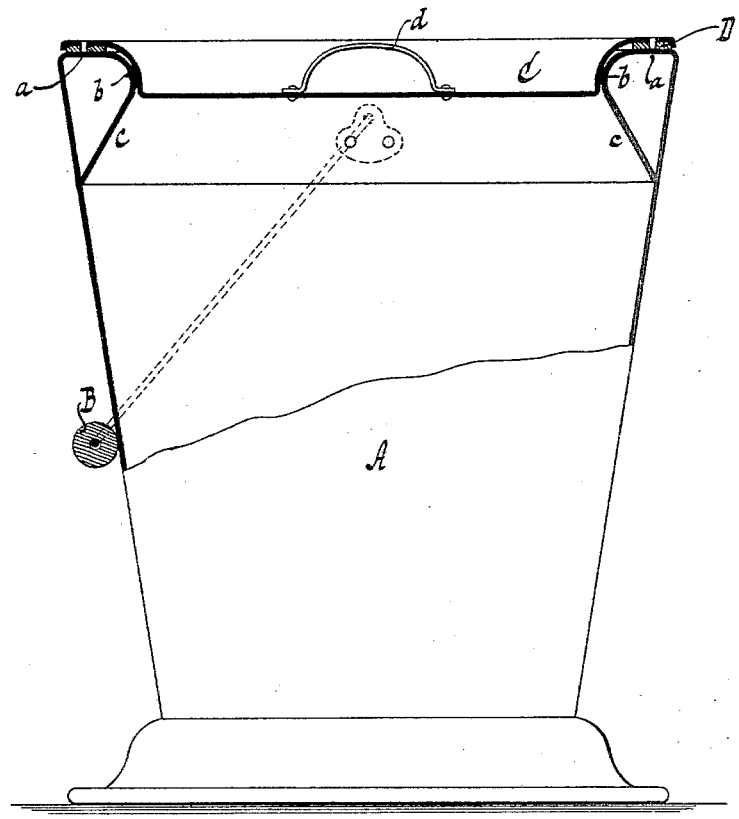
Figure 2:
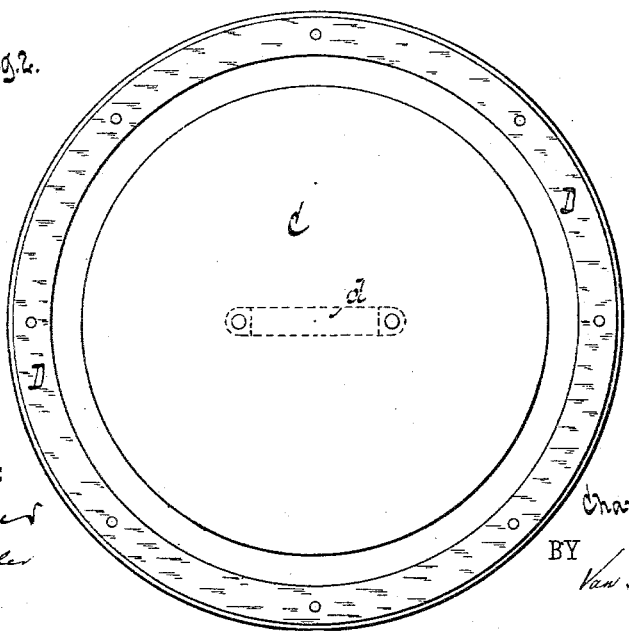

Figure 1 is a side elevation, part in section, of my improved chamber-pail. Fig. 2 is an inverted plan view of the cover.

Similar letters indicate corresponding parts.

In the drawings, the letter A designates the chamber-pail, provided with a suitable bail, B, and the upper part of which is turned downward around the edge so as to form a seat, the annular part $a$ of which is comparatively flat, the part $b$ convex, while the part $c$ runs at an inclination to the sides of the pail.

C is the cover, provided with a handle, $d$, and the rim of which is made to conform in curvature to the form of the upper part of the pail, and to the outer or flat portion of this rim is secured a suitable gasket, D, whereby the chamber-pail is closed air-tight.

I am aware that chamber-pails have been previously made with seats; but in these the metal forming the top of the pail was bent outwardly to project beyond the body of the same, whereby the pail is rendered less compact and less suitable for the purpose desired.

The opening in the pail may be made smaller by a reducing-ring placed on the seat.

What I claim as new, and desire to secure by Letters Patent, is—

1. A chamber-pail having its upper part turned inward and then downward to join the side of the pail and form a seat integral with the body of the pail and stiffened by its union with the side of the pail, substantially as described.

2. The combination of a pail, A, having its upper part, $c$, turned inwardly and then curved downwardly at $b$ to form a seat, a cover, C, curved to fit the seat, and a gasket, D, attached to the cover and taking upon the seat, substantially as described.

In testimony whereof I have hereunto set my hand and seal in the presence of two subscribing witnesses.

CHARLES F. CROCKETT. [L. S.]

Witnesses:
W. HAUFF,
E. F. KASTENHUBER.